May 17, 1949. C. B. LUNDSTROM 2,470,506
PICKER STICK
Filed Oct. 19, 1948
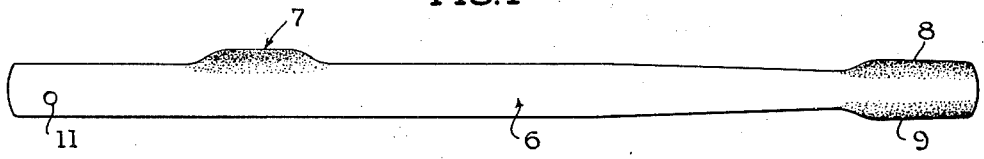
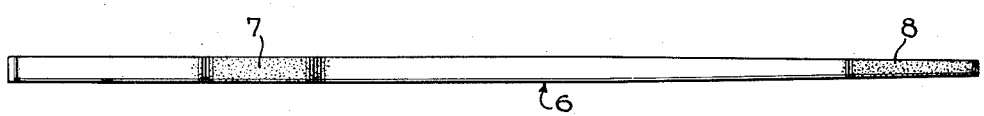
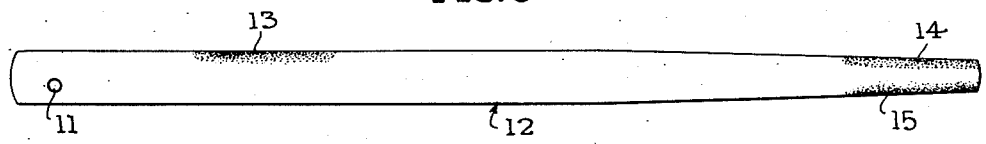
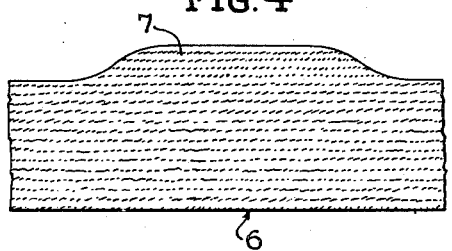
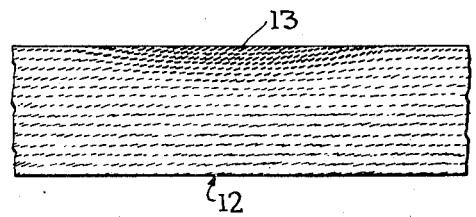
Inventor
Carl Brynolf Lundstrom
By Dodge and Sons
Attorneys Patented May 17, 1949

2,470,506

UNITED STATES PATENT OFFICE 2,470,506

PICKER STICK

Carl Brynolf Lundstrom, Little Falls, N. Y.

Application October 19, 1948, Serial No. 55,400

6 Claims. (Cl. 139—157)

This invention relates to picker sticks for looms and provides a stick which combines the advantageous characteristics of densification to resist wear and impact without material adverse effect on weight or elasticity or both.

It has heretofore been proposed to compress the surfaces of bowling balls, the ends of arrows, and portions of the blades of airplane propellers, but none of these involved, and hence none took account of the desirability of preserving the flexibility of a slender element such as a picker stick.

According to the invention the stick is densified where it is engaged by the strap, and also where it works in the picker but these densified areas are so located and so graduated in density, that the stick preserves substantially its original elasticity continuously throughout its length, and is not locally weakened at any point.

This result is attained partly by controlling the area and depth of plasticizing treatment, so as to leave a central strip of unaltered wood even at points where opposite faces of the stick are densified. To minimize any tendency toward strain intensification where treated and untreated portions of the wood meet, the degree of densification is graduated.

In this way diverse characteristics are combined without conflict, and the resulting picker stick has a longer life than an untreated wood stick, and better operating characteristics than has a stick densified throughout.

The invention will now be described by reference to the accompanying drawings in which:

Figs. 1 and 2 are respectively face and edge elevations of a blank prior to densification.

Fig. 3 is a face view of the picker stick after densification.

Figs. 4 and 5 are fragmentary views on a larger scale, showing similar portions of Figs. 1 and 3 and showing how the grain of the wood is displaced in densification.

In Figs. 1 and 2, the zones of treatment with a plasticizer are indicated by stippling. In Fig. 3 the approximate depth of densification is indicated by stippling. In Figs. 4 and 5 the wood grain in the densified portion is indicated on a more or less diagrammatic basis.

Refer first to Figs. 1 and 2. A blank 6 tapered as shown in edge view in Fig. 2 and having the contour indicated in Fig. 1 is formed from hickory or other suitable wood. This contour is that of the finished stick except for the boss 7 on one edge at the area engaged by the picker strap and the bosses 8 and 9 opposite to each other at the swinging end of the stick where it engages the picker. The bosses 8 and 9 like boss 7 are formed on edge portions of the stick and have tapered ends. The hole 11 for the pivot pin may be formed in the blank before or after the densifying treatment.

A blank 6 formed as shown in Figs. 1 and 2 is masked in any suitable way to expose the bosses 7, 8 and 9 while protecting the remainder of the stick and the bosses 7, 8 and 9 are steamed. The steam may or may not carry a water soluble chemical plasticizer such as (1) urea or (2) urea and dimethylol urea with a buffer. The latter is slightly advantageous as it is resin-forming. No novelty inheres in the suggested chemical treatment, or in the use of steam.

Steaming is continued until the bosses are plasticized to depths suggested by the stippling in Figs. 1 and 2. Since the steam penetrates the wood gradually, the effect of steaming is greatest at the surface and diminishes inward. This is highly advantageous as it leads to similarly graduated densification.

Then the bosses 7, 8 and 9 are densified by pressing the stick edgewise to the final form shown in Fig. 3. The pressing is preferably carried out in a confining form or mold (not shown) so that densification occurs as the result of compression in one direction.

The final product is a stick 12 with pivot hole 11 and three densified portions 13, 14 and 15 each of which is densest at the edge surface and diminishes in density inward from said surface, and also toward its ends.

This graduation of densification is illustrated in Fig. 5, Figs. 4 and 5 respectively showing the grain as it is before and after pressing. Graduation of densification in depth is attributed to graduation of steam penetration while graduation at the ends of the densified areas arises largely from the taper at the ends of the bosses 7, 8 and 9.

At any rate, a picker stick so formed and treated has an untreated zone extending from end to end, preserves the original elasticity of the wood, and weighs little more than an ordinary wooden picker stick of the same dimensions. There is no tendency for the stick to fail at the end of any densified area, a circumstance which indicates that the wood fiber is not ruptured, and strain intensifying cracks are not produced.

It is considered desirable that the undensified central core extend between the densified portions 14 and 15 for substantially their entire length because this affords elasticity and a transition to the wholly untreated portion of the stick. However, it is perhaps unimportant and certainly less important that the untreated central core extend to the very tip end of the stick, though that is the arrangement illustrated and used, and hence known to be successful.

The picker stick chosen for illustration in Fig. 3 is one suited for use on a Crompton and Knowles worsted loom and its precise form and dimensions are not a feature of the invention, which obviously can be adapted to picker sticks of various design.

I claim:

1. A wooden picker stick for use in looms, said stick having integral portions in which wood fibers, in number materially exceeding the number characteristic of a similar cross sectional area of untreated wood, are present, are bonded together in a transversely compressed state and afford localized densified portions to resist wear and impact, said densified portions being so limited as to location and transverse extent that the picker stick has throughout substantially its entire length a zone in which the wood is not densified.

2. A picker stick as defined in claim 1 in which the compression of the fibers in the densified portions diminishes from the surface of the stick inward.

3. A picker stick as defined in claim 1 in which the compression of the fibers in the densified portion diminishes from the surface of the stick inward and also diminishes toward the extremities of the densified portions measured in the direction of the length of the stick.

4. A picker stick as defined in claim 1, in which the fibers in each densified portion are all displaced in a single direction transverse to the stick.

5. A picker stick as defined in claim 1 having opposed approximately flat relatively wide faces, and opposed relatively narrow edge faces, the densified portions being located on the edge faces, and the undensified zone extending from wide face to wide face and between said densified portions.

6. A picker stick as defined in claim 1 having opposed approximately flat relatively wide faces, and opposed relatively narrow edge faces, the densified portions being located on the edge faces and being compressed in directions normal to said edge faces, and the undensified zone extending from wide face to wide face and between said densified portions.

CARL BRYNOLF LUNDSTROM.

REFERENCES CITED

The following references are of record in the file of this patent:

UNITED STATES PATENTS

| Number | Name | Date |
|---|---|---|
| 2,101,542 | Hartzell | Dec. 7, 1937 |
| 2,323,491 | Schneeberger | July 6, 1943 |
| 2,419,086 | Norris et al. | Apr. 15, 1947 |